US006999522B2

(12) United States Patent
Shearer, III

(10) Patent No.: US 6,999,522 B2
(45) Date of Patent: Feb. 14, 2006

(54) CONSTRAINED-ENVELOPE DIGITAL COMMUNICATIONS TRANSMITTER AND METHOD THEREFOR

(75) Inventor: Daniel Davidson MacFarlane Shearer, III, Scottsdale, AZ (US)

(73) Assignee: Intersil Americas, Inc., Scottsdale, AZ (US)

( * ) Notice: Subject to any disclaimer, the term of this patent is extended or adjusted under 35 U.S.C. 154(b) by 729 days.

(21) Appl. No.: 09/967,408

(22) Filed: Sep. 28, 2001

(65) Prior Publication Data

US 2003/0063682 A1 Apr. 3, 2003

(51) Int. Cl.
*H04L 27/04* (2006.01)

(52) U.S. Cl. .................................................... 375/295
(58) Field of Classification Search ................ 375/295, 375/135, 140, 141, 146, 296
See application file for complete search history.

(56) References Cited

U.S. PATENT DOCUMENTS

| | | | | |
|---|---|---|---|---|
| 4,313,205 A | * | 1/1982 | Rhodes ........................ 375/86 |
| 4,757,519 A | * | 7/1988 | Collison et al. .............. 375/60 |
| 4,962,510 A | | 10/1990 | McDavid et al. ............. 375/67 |
| 5,049,832 A | | 9/1991 | Cavers ........................ 330/149 |
| 5,103,427 A | * | 4/1992 | Erdol et al. .................... 367/7 |
| 5,287,387 A | | 2/1994 | Birchler ....................... 375/60 |
| 5,379,322 A | | 1/1995 | Kosaka et al. ................ 375/60 |
| 5,381,449 A | | 1/1995 | Jasper et al. .................. 373/89 |
| 5,566,164 A | | 10/1996 | Ohlson ........................ 370/18 |
| 5,600,676 A | | 2/1997 | Ramesh ...................... 375/283 |
| 5,606,578 A | | 2/1997 | O'Dea ........................ 375/298 |
| 5,621,762 A | | 4/1997 | Miller et al. ................ 375/298 |
| 5,629,961 A | | 5/1997 | Kawabata .................... 375/308 |
| 5,638,403 A | | 6/1997 | Birchler et al. ............. 375/296 |
| 5,696,794 A | | 12/1997 | O'Dea ........................ 375/296 |
| 5,727,026 A | | 3/1998 | Beukema ..................... 375/296 |
| 5,786,728 A | | 7/1998 | Alinikula |
| 5,805,640 A | | 9/1998 | O'Dea et al. ................ 375/296 |
| 6,072,364 A | | 6/2000 | Jeckeln et al. |
| 6,075,411 A | | 6/2000 | Briffa et al. |
| 6,104,761 A | * | 8/2000 | McCallister et al. ......... 375/296 |
| 6,141,390 A | | 10/2000 | Cova |

(Continued)

OTHER PUBLICATIONS

May & Rohling, Reducing the Peak-to_average Power Ratio in OFDM Radio Transmission Systems, IEEE Vehicular Technology Conference, 1998.

(Continued)

*Primary Examiner*—Kenneth Vanderpuye
*Assistant Examiner*—Dung X. Nguyen
(74) *Attorney, Agent, or Firm*—Lowell W. Gresham; Jordan M. Meschkow; Meschkow & Gresham P.L.C.

(57) ABSTRACT

A constrained-envelope digital communications transmitter (10) places constraints on the envelope of a spectrally constrained, digitally modulated communication signal (42) to lower peak-to-average power ratio without allowing significant spectral regrowth. A communication signal (14,42) is applied to a plurality of cascade-coupled constrained-envelope generators (50). Each constrained-envelope generator (50) detects overpeak events (52) and configures corrective impulses (54) for the overpeak events (52). The corrective impulses (54) are filtered into shaped pulses (88) that exhibit a constrained spectrum and combine with the communication signal (14, 42) to reduce an unwanted signal peak. Trailing portions (92) of the shaped pulses (88) are fed-back and combined with the communication signal (14,42) so that future overpeak events (52) are identified after compensation is made for the influence of the trailing portions (92) of any recently past shaped pulses (88) on the communication signal (14,42).

24 Claims, 4 Drawing Sheets

U.S. PATENT DOCUMENTS

| | | |
|---|---|---|
| 6,236,864 B1 | 5/2001 | McGowan et al. |
| 6,366,619 B1 * | 4/2002 | McCallister et al. ........ 375/295 |
| 6,778,611 B1 * | 8/2004 | Ungerboeck ................ 375/285 |
| 2002/0101935 A1 | 8/2002 | Wright et al. |
| 2002/0101936 A1 | 8/2002 | Wright et al. |

OTHER PUBLICATIONS

Monzingo & Amoroso, Supress Spectral Sidelobe Regrowth with Data Signal Predistortion, Applied Microwave & Wireless, pp. 62-70.

* cited by examiner

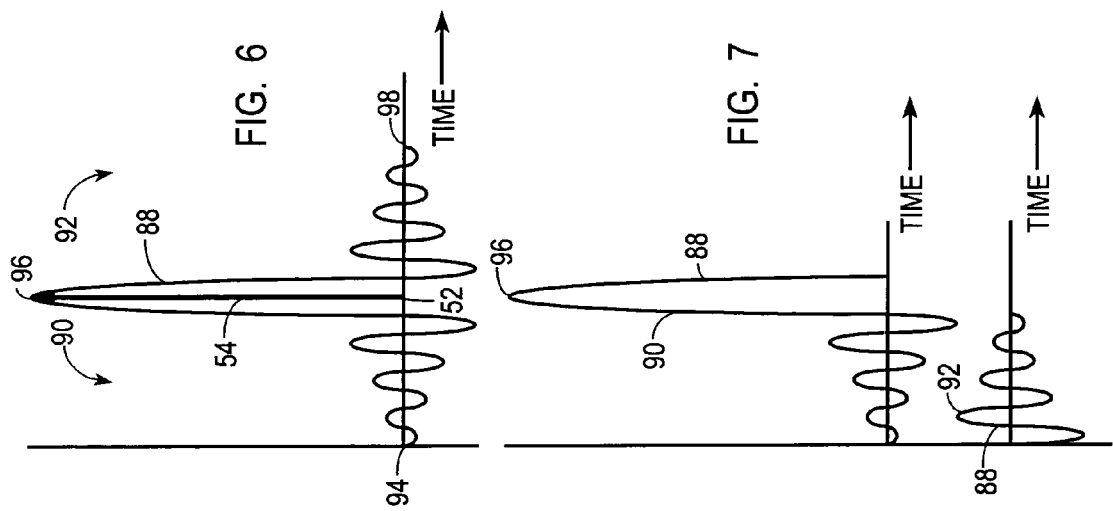
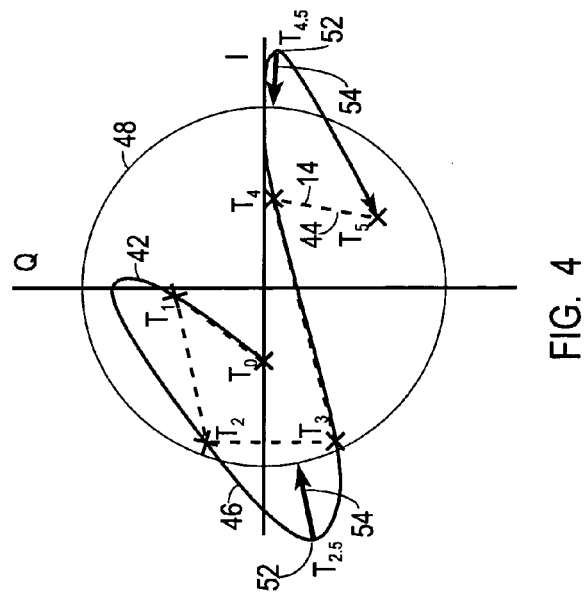

CONSTRAINED-ENVELOPE DIGITAL COMMUNICATIONS TRANSMITTER AND METHOD THEREFOR

TECHNICAL FIELD OF THE INVENTION

The present invention relates generally to the field of electronic communications. More specifically, the present invention relates to the field of constrained-envelope digital transmitters.

BACKGROUND OF THE INVENTION

Many prior art digital communication systems use a pulse-shaping filter, and often some form of Nyquist-type filtration, such as Nyquist, root-Nyquist, raised cosine-rolloff, etc., to shape and spread the information conveyed in each unit interval of modulated data over many unit intervals in a manner that dramatically reduces the spectrum required to transmit the information but permits efficient recovery of the information without significant intersymbol interference. Lower alpha ($\alpha$) values for the pulse-shaping filter are more desirable because lower values lead to reduced spectrum requirements. Unfortunately, as $\alpha$ is reduced, the peak power needed to faithfully reproduce the filtered, spectrally constrained signal increases. A similar dilemma occurs in connection with applications where many channels are combined into a composite signal prior to amplification, regardless of modulation type and independent of pulse shaping. Such composite signals are commonly generated at hubs and base stations. As a result of combining multiple signals, the peak-to-average power ratio of the resulting composite signal increases.

A communication signal with a high peak-to-average power ratio is undesirable because such a signal requires the use of a high quality linear amplifier capable of amplifying the greatest signal peaks. As peak-to-average power ratio increases, power amplifier costs likewise increase to accommodate increasingly high and increasingly infrequent peaking events. Since a power amplifier often represents one of the more expensive items in a transmitter circuit, a need exists for reducing peak-to-average power ratios in communication signals so that inexpensive power amplifiers may be used and so that power amplifiers are used efficiently.

The problem of reducing peak-to-average power ratios in communication signals is difficult to solve. One technique applies hard limiting to the communication signal to prohibit the otherwise greatest peaking events from occurring in the first place. However, this is a highly undesirable solution because it leads to dramatic spectral regrowth. A moderately better, but still undesirable, technique uses a spectrally inefficient pulse shape in the pulse-shaping filter to limit the greatest signal peaks. But, this technique still suffers from an undesirable amount of spectral regrowth. Other complex techniques require such extensive processing capabilities that they are not practical in connection with high-throughput or continuous, rather than burst, transmission applications, i.e., those greater than 0.5 Mbps, such as the transmission of high-speed video data through a single channel or other data through multiple channels in parallel.

U.S. Pat. No. 6,104,761, entitled *"Constrained-Envelope Digital-Communications Transmission System and Method Therefor,"* by McCallister et al., is incorporated herein by reference. U.S. Pat. No. 6,104,761 teaches a technique to reduce the peak-to-average power ratio of a communication signal without enduring significant amounts of spectral regrowth. Using the technique of U.S. Pat. No. 6,104,761, the greatest peaking events are detected and compensated by adding spectrally efficient corrective pulses to the communication signal. In order to be spectrally efficient, the corrective pulses typically have a duration of several unit intervals.

While the technique of U.S. Pat. No. 6,104,761 produces adequate results for many applications, it has been discovered that the corrective pulses themselves may combine in certain situations in a manner that leads to an undesired signal peak, even though an acceptable signal level would have been present had the corrective pulses not been applied. As a result, while significant peak-to-average power reductions were observed, such peak-to-average power reductions were not as great as they could have been.

SUMMARY OF THE INVENTION

It is an advantage of the present invention that an improved constrained-envelope digital communications transmitter and method are provided.

Another advantage is that a constrained-envelope digital communications transmitter and method are provided to generate a signal which, when combined with a modulated signal that exhibits a predetermined bandwidth, reduces peak-to-average power ratio without significantly increasing the predetermined bandwidth.

Another advantage is that a modulated signal which exhibits a desired bandwidth but undesirably large peak-to-average power ratio is adjusted to lessen the peak-to-average power ratio without significantly increasing bandwidth.

Another advantage of the present invention is that spectrally constrained corrective pulses are added to a modulated signal in a manner that minimizes growth in peak-to-average power ratio caused by the corrective pulses.

Another advantage of the present invention is that, in one embodiment, at least two constrained-envelope generators are coupled in series so that a downstream constrained-envelope generator can compensate for peak-to-average power ratio growth caused by an upstream constrained-envelope generator.

These and other advantages are realized in one form by an improved method of operating a digital communications transmitter to constrain envelope and spectral regrowth while processing a communication signal. The method calls for monitoring an overpeak-capable signal stream to identify occurrences of overpeak events by determining when a threshold is exceeded. When one of the overpeak events is identified, a corrective impulse configured to compensate for an amount by which the overpeak-capable signal stream is in excess of the threshold is generated. The corrective impulse is filtered to generate a shaped pulse having a leading portion and a trailing portion. The trailing portion of the shaped pulse is fed back so that, after the one of the overpeak events, the overpeak-capable signal stream is responsive to the trailing portion of the shaped pulse and the communication signal. A constrained-envelope signal stream is produced in response to the communication signal and the corrective impulse.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a locus of a hypothetical digitally modulated communication signal as it progresses through five unit intervals;

FIG. 6 shows one exemplary shaped pulse that may be implemented by various filters in the transmitter of FIG. 1;

FIG. 7 shows concurrently-generated leading and trailing portions of the shaped pulse depicted in FIG. 6.

DETAILED DESCRIPTION OF THE PREFERRED EMBODIMENTS

Figure 1:
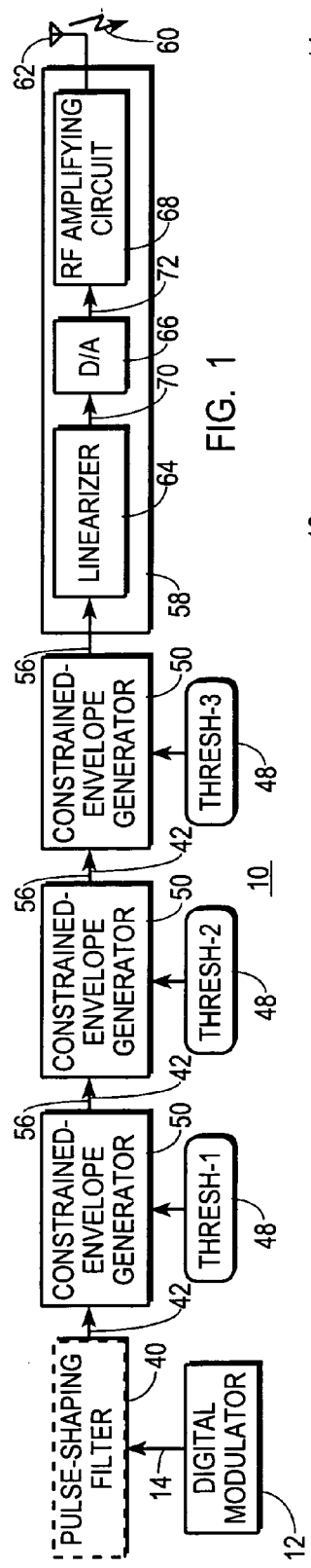
FIG. 1 shows a block diagram of a digital communications transmitter configured in accordance with one embodiment of the present invention.

FIG. 1 shows a block diagram of a digital communications transmitter 10 configured in accordance with one embodiment of the present invention. Transmitter 10 includes a digital modulator 12 which generates a digitally modulated communication signal 14. Communication signal 14 is spectrally unconstrained. In other words, it exhibits a relatively wide bandwidth. Typically, the bandwidth is so wide that it will not comply with the requirements of a spectral mask with which transmitter 10 must comply. Accordingly, further processing is performed on spectrally-unconstrained communication signal 14 to constrain the spectrum of the communication signal. Those skilled in the art will appreciate that in RF, cable, optical, and other types of communications the use of constrained bandwidths is desirable because constrained-bandwidth channels permit the communication of a greater amount of information in a given bandwidth.

Figure 2:
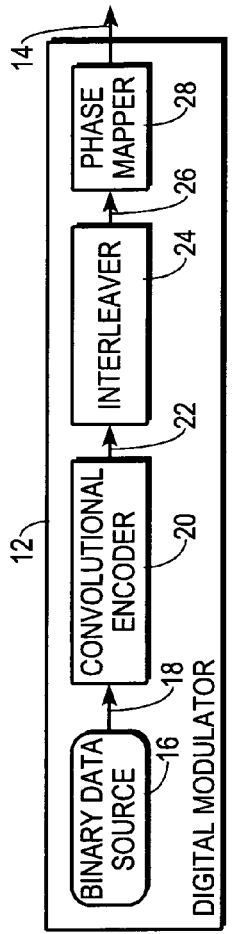
FIG. 2 shows a block diagram of a first exemplary digital modulator usable in the transmitter of FIG. 1.
Figure 3:
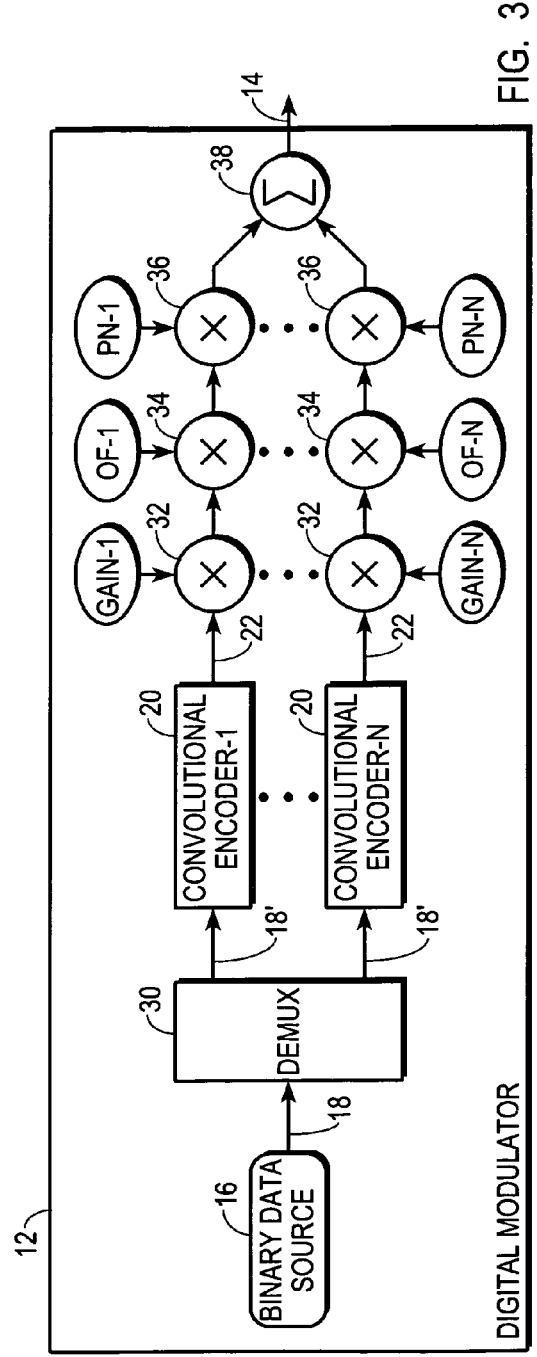
FIG. 3 shows a block diagram of a second exemplary digital modulator usable in the transmitter of FIG. 1.

Any type of digital modulator known to those skilled in the art may be employed as digital modulator 12. For example, FIG. 2 shows a block diagram of a first exemplary digital modulator 12 which may be suitable for APSK (amplitude-phase-shift-keying) modulation, also called QAM (quadrature-amplitude-modulation). FIG. 3 shows a block diagram of a second exemplary digital modulator 12 which may be suitable for CDMA (code-division-multiple-access) modulation, also called spread spectrum. However, those skilled in the art will appreciate that other types of digital modulations and digital modulators 12 may be used as well.

Referring to FIG. 2, digital modulator 12 has a binary data source 16 providing a binary input signal stream 18 of to-be-communicated data. Binary data source 16 may be any circuitry, device, or combination thereof producing input signal stream 18. Input signal stream 18 is made up of binary data that may be pre-encoded in any desired manner. That is, input signal stream 18 may be made up of data that has no encoding, concatenated encoding, Reed-Solomon block encoding, or any other form of encoding desired for or required of the communications scheme in use. In addition, input signal stream 18 may include data intended to be communicated to any number of diverse destinations or end users.

In the preferred embodiments, input signal stream 18 is a stream of continuous data (as contrasted with burst data) passing to an input of a convolutional encoder 20, but continuous data is not a requirement of the present invention. Convolutional encoder 20 convolutionally encodes (e.g., Viterbi or turbo encodes) input signal stream 18 into an encoded signal stream 22. However, convolutional encoder 20 may be omitted. An interleaver 24 temporally decorrelates encoded signal stream 22 to produce an interleaved signal stream 26. However, those skilled in the art will appreciate that interleaver 24 is not desired in all embodiments of digital modulator 12, for example when convolutional encoder 20 is omitted. In the preferred embodiments, interleaved signal stream 26 passes to an input of a phase mapper 28. When interleaver 24 is omitted, encoded signal stream 22 is passed directly to the input of phase mapper 28. When both convolutional encoder 20 and interleaver 24 are omitted, binary input signal stream 18 passes directly to the input of phase mapper 28.

Phase mapper 28 maps symbols (i.e., one or more-bit binary data units) present in the communication signal stream presented to it into constellation phase points in a manner well-understood to those skilled in the art. Phase mapper 28 produces spectrally-unconstrained communication signal 14. Those skilled in the art will appreciate that communication signal 14 may be represented by a continuous stream of complex values, in which each complex value may be expressed as having I,Q components in the Cartesian coordinate system, or M,$\phi$ components in the polar coordinate system. Typically, one complex value is generated from phase mapper 28 per unit interval.

Referring to FIG. 3, when digital modulator 12 is configured to implement a CDMA communication scheme, binary data source 16 again provides binary input signal stream 18 of to-be-communicated data. In this CDMA embodiment, binary input signal stream 18 includes data to be transmitted through a number of different CDMA code-channels. Binary input signal stream 18 is provided to a demultiplexer (DEMUX) 30, which parses input signal stream 18 into a quantity N, where N represents the number of independent code-channels provided by modulator 12, of code-channel signal streams 18'. The N code-channel signal streams 18' are respectively routed to N convolutional encoders 20, which generate N encoded signal streams 22. Although not shown, interleavers may be inserted at this point in the signal flow. Each of the N encoded signal streams 22 is routed through respective multiplication stages 32, 34 and 36. Multiplication stage 32 allows the application of scale factors that adjust the relative gain of each code-channel for the purposes of power control. Multiplication stage 34 may be effected by a modulo-2 addition and allows the application of an orthogonal function (OF) (e.g., a Walsh or Hadamard code). Multiplication stage 36 applies various pseudo-noise (PN) codes on a unit chip interval basis to spread the code-channels in a well-known manner. Multiplication stage 36 may also be effected by a modulo-2 addition.

After stages 32, 34 and 36, the N code-channels are summed in an adding stage 38 to form a composite signal stream that represents spectrally-unconstrained communication signal 14.

Referring back to FIG. 1, spectrally-unconstrained communication signal 14 is applied to a pulse-shaping filter 40, which generates a spectrally-constrained communication signal 42. Spectrally-constrained communication signal 42 is typically represented as a continuous stream of complex values. That stream of complex values may have a greater sample rate than spectrally-unconstrained communication signal 14. In particular, spectrally-constrained communication signal 42 may be represented by two or more complex values per unit interval. In the preferred embodiments, pulse-shaping filter 40 is desirably realized as a Nyquist-type filter, such as a Nyquist, root-Nyquist, raised cosine-rolloff, etc., filter. Filter 40 may be implemented as a finite impulse response (FIR) filter, but this implementation is not a requirement. In orthogonal frequency division multiplex (OFDM) systems, also known as multitone modulation (MTM) systems, pulse-shaping filters 40 may be implemented using a transmultiplexer or equivalent circuitry.

FIG. 4 shows a locus 44 of a hypothetical spectrally-unconstrained communication signal 14 (dotted line) and a locus 46 of a corresponding spectrally-constrained communication signal 42 (solid line) as they progress through five unit intervals. The five unit intervals have temporal boundaries located between instants in time denoted using the labels $T_0$–$T_5$. Those skilled in the art will appreciate that loci 44 and 46 are of a hypothetical nature and need not reflect any actual locus achievable with any particular type of digital modulator 12. Rather, loci 44 and 46 are illustrated to clarify the concepts and relationships discussed herein. In particular, FIG. 4 illustrates the operation of pulse-shaping filter 40 upon the communication signal.

As depicted in FIG. 4, the magnitude of spectrally-unconstrained communication signal 14 (FIG. 1) remains less than a maximum value depicted as threshold 48. However, abrupt phase changes demonstrated by spectrally-unconstrained locus 44 can only be carried out within a relatively wide bandwidth. In comparison, spectrally-constrained locus 46 does not experience such abrupt phase changes and can be carried out in a smaller bandwidth. Unfortunately, an unwanted consequence of applying spectral constraints in pulse-shaping filter 40 (FIG. 1) is that amplitude peaks in spectrally-constrained locus 46 are greater than in spectrally-unconstrained locus 44.

In order to faithfully reproduce locus 46, a power amplifier located downstream of pulse-shaping filter 40 (FIG. 1) would be required to have a linear range of operation between the minimum and maximum possible magnitudes that locus 46 can exhibit. Such a wide dynamic linear amplification range is undesirable because it typically requires the use of a sophisticated and relatively expensive power amplifier. Accordingly, subsequent processing in transmitter 10 (FIG. 1), discussed below, reduces the maximum possible magnitudes achievable by locus 46, but without significantly requiring locus 46 to undergo abrupt phase changes that would necessitate a wide bandwidth.

Referring back to FIG. 1, spectrally-constrained communication signal 42 generated by pulse-shaping filter 40 is applied to a number of cascaded constrained-envelope generators 50. Pulse-shaping filter 40 is depicted in dotted lines in FIG. 1 because in one embodiment of the present invention, discussed below in connection with FIG. 8, the filtering function of pulse-shaping filter 40 may be combined with the envelope constraining function of constrained-envelope generator 50, or at least the initial, most upstream instance of the series-connected constrained-envelope generators 50.

U.S. Pat. No. 6,104,761 describes one embodiment of a constrained-envelope generator 50 that may be used in transmitter 10. Alternate embodiments of constrained-envelope generator 50 are discussed herein. Referring to FIG. 4, in general the embodiment of constrained-envelope generator 50 discussed in U.S. Pat. No. 6,104,761 and the below-discussed embodiments of constrained-envelope generator 50 detect "overpeak" events 52. FIG. 4 depicts two overpeak events 52 that happen to occur around time instants $T_{2.5}$ and $T_{4.5}$. However, nothing requires overpeak events 52 to occur at midpoints between any particular time instants. For purposes of the present discussion, overpeak events are local maximums or peaks in locus 46 which exhibit magnitudes greater than threshold 48. In other words, overpeak events 52 occur when spectrally-constrained communication signal 42 (FIG. 1) exhibits peak magnitudes, when viewed over a relatively short temporal interval and the peak magnitudes are greater than, or over, threshold 48.

When an overpeak event 52 is detected, constrained-envelope generator 50 determines the amount by which the peak exceeds threshold 48. This determination produces a complex corrective impulse 54 having both magnitude and phase components, which may likewise be expressed in a Cartesian coordinate system. Corrective impulse 54 is configured in magnitude and phase so that it could be applied to reduce the magnitude of locus 46 to threshold 48 at a subject overpeak event 52. However, corrective impulse 54 is not so applied, at least directly, because the reproduction of corrective impulse 54 would lead to spectral regrowth. Rather, constrained-envelope generator 50 then filters corrective impulse 54 into a finite duration shaped pulse that meets spectral constraints, and combines that shaped pulse with spectrally-constrained communication signal 42.

In the preferred embodiments, a shaped pulse that meets spectral constraints extends over several unit intervals. Accordingly, each shaped pulse potentially alters the trajectory of locus 46 to some extent over a duration of several unit intervals. In some unusual situations, that trajectory alteration may cause the resulting altered locus 46 to experience an overpeak event 52 where it would not have otherwise experienced one but for the alteration. In other situations, when two or more shaped pulses are applied to spectrally constrained signal 42 within the duration of the shaped pulses, the influences of the two or more shaped pulses may combine to cause overpeak events 52 where they would not otherwise have occurred.

Referring back to FIG. 1, each constrained-envelope generator 50 produces a constrained-envelope, constrained-spectrum signal stream 56. Constrained-envelope, constrained-spectrum signal stream 56 represents a locus 46 (FIG. 4) that has been altered through the application of shaped pulses, as described above. Each signal stream 56 produced by an upstream constrained-envelope generator 50 serves as a spectrally-constrained communication signal 42 input to the immediately downstream constrained-envelope generator 50. The use of more than one constrained-envelope generator 50 allows the downstream constrained-envelope generators 50 to further constrain the communication signal envelope by reducing peaks associated with overpeak events 52 that may be present in the upstream constrained-envelope, constrained-spectrum signal streams 56. As discussed above, such overpeak events may have resulted from the application of shaped pulses in upstream constrained-envelope generators 50.

Those skilled in the art will appreciate that the present invention imposes no requirement on the precise number of constrained-envelope generators 50 that may be cascaded in transmitter 10. A greater number of constrained-envelope generators 50 will result in a greater amount of peak reduction in the communication signal. However, a greater number of constrained-envelope generators 50 will likewise lead to increased communication signal latency and transmitter 10 complexity. Two or three cascaded constrained-envelope generators 50 appear to achieve a beneficial balance between these two competing design considerations in the preferred embodiments. However, improvements are nevertheless achieved by using only one constrained-envelope generator 50 when configured as discussed below in connection with FIGS. 5–8.

Referring to FIGS. 1 and 4, thresholds 48 used by constrained-envelope generators 50 are relatively constant values in the preferred embodiments. While thresholds 48 may desirably be set at a magnitude roughly equivalent to the maximum magnitude expressed in the upstream-most spectrally-unconstrained communication signal 44, this is no requirement of the present invention. While the same value for thresholds 48 may be used in all constrained-envelope generators 50, benefits may result from using different thresholds 48. In one embodiment, desirable results were obtained by setting the threshold 48 used in the upstream-most constrained-envelope generator 50 to a slightly higher value, and setting the thresholds 48 used in all other constrained-envelope generators 50 to a slightly lower value.

The constrained-envelope, constrained-spectrum signal stream 56 generated by the downstream-most one of constrained-envelope generators 50 is passed to an input of a substantially linear amplifier 58. Substantially linear amplifier 58 produces an RF broadcast signal 60, which is broadcast via transmitter antenna 62. In the preferred embodiment, substantially linear amplifier 58 is made up of a digital linearizer 64, a digital-to-analog converter (D/A) 66, and a radio-frequency (RF) amplifying circuit 68. Those skilled in the art will appreciate that substantially linear amplifier 58 may be realized in different embodiments than described here, and that utilization of an embodiment does not depart from the scope of the present invention.

Within substantially linear amplifier 58, digital linearizer 64 alters constrained-envelope, constrained-spectrum signal stream 56 into a pre-distorted digital signal stream 70. Pre-distorted digital signal stream 70 is made non-linear in just the right manner to compensate for non-linearities within digital-to-analog converter 66 and RF amplifying circuit 68, hence linearizing substantially linear amplifier 58. Digital-to-analog converter 66 then converts pre-distorted digital signal stream 70 into an analog baseband signal 72. Analog baseband signal 72 is then upconverted and amplified by RF amplifying circuit 68 into RF broadcast signal 60 and transmitted via transmitter antenna 62. While FIG. 1 may suggest that broadcast signal 60 is an RF communication signal, signal 60 may alternatively be broadcast over a cable, wire pair, optical fiber, laser beam, or the like.

Figure 5:
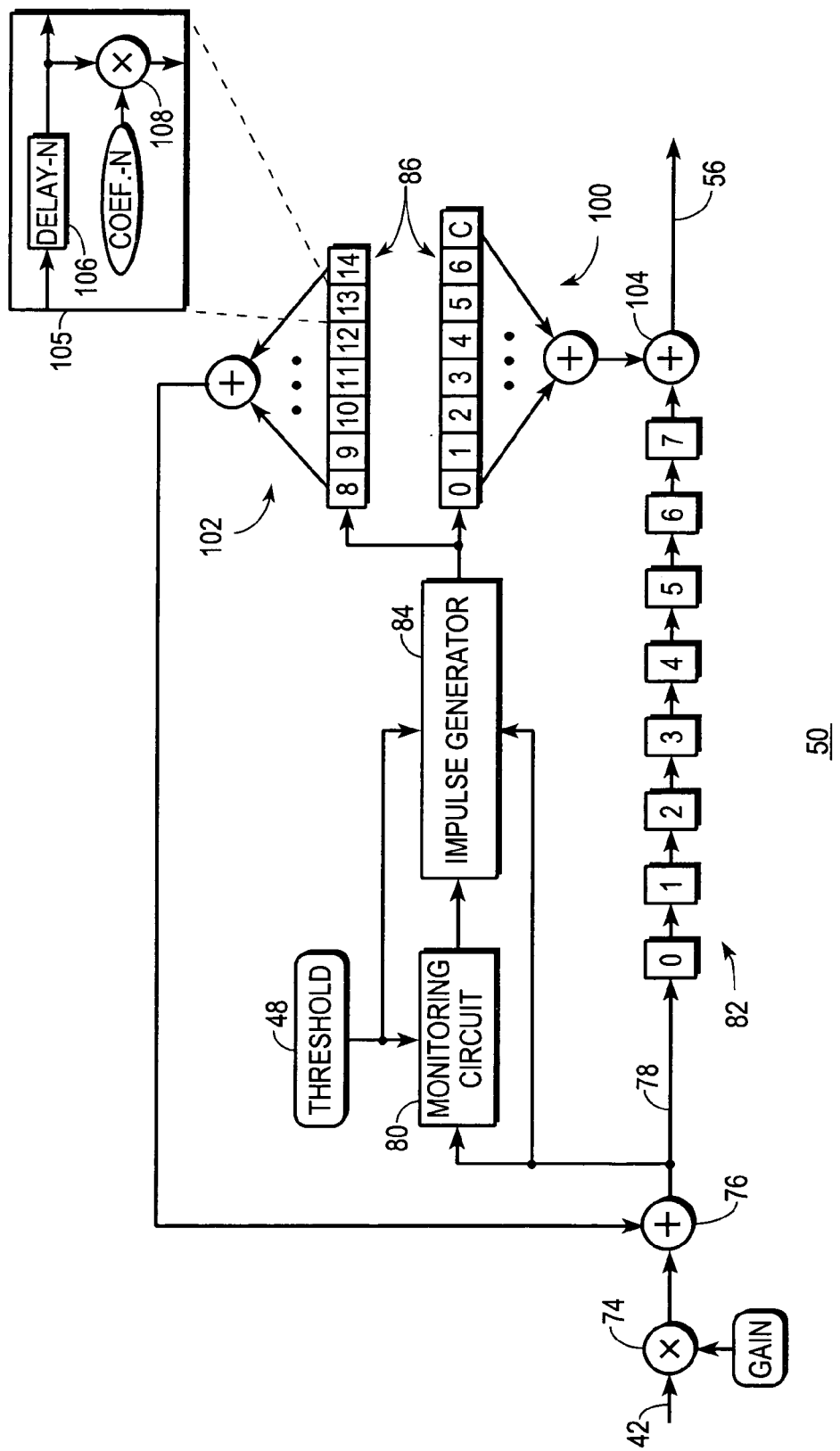
FIG. 5 shows a block diagram of a first embodiment of a constrained-envelope generator usable in the transmitter of FIG. 1.

FIG. 5 shows a block diagram of a first embodiment of a constrained-envelope generator 50 usable in transmitter 10. The FIG. 5 embodiment of constrained-envelope generator 50 may be used in the position of any one of the constrained-envelope generators 50 depicted in FIG. 1.

Constrained-envelope generator 50 receives a spectrally-constrained communication signal 42 at an input of an optional scaling stage 74. At scaling stage 74, a gain factor may be applied as needed by the application. For example, in some applications power management techniques may require communication devices located closer together to operate at lower power levels than father-apart communication devices so long as an adequate signal-to-noise ratio may be delivered at the lower power level. Such power management techniques may be applied at scaling stage 74 if not applied elsewhere in transmitter 10 (FIG. 1).

After scaling, the spectrally constrained signal stream is applied to a combining circuit 76. Combining circuit 76 adds the spectrally constrained signal stream to a trailing portion of a shaped pulse, discussed below. Combining circuit 76 generates an overpeak-capable signal stream 78, which passes to a monitoring circuit 80, a delay circuit 82, and a impulse generator 84.

As discussed above in connection with FIG. 4, spectrally-constrained communication signal 42 is susceptible to overpeak events 52. The combination of signal 42 with the trailing portion of the shaped pulse may alter signal 42, but need not negate overpeak events 52. Rather, at any given instant overpeak-capable signal stream 78 represents signal 42 after compensation for the trailing portion of any shaped pulse that may have been added to signal 42 within the previous few unit intervals. Accordingly, shaped pulses generated to compensate for future overpeak events 52 are configured to accommodate the trailing portion of other shaped pulses that may have been combined with signal 42 in the recent past.

Referring to FIGS. 4 and 5, monitoring circuit 80 is responsive to overpeak-capable signal stream 78 and threshold 48. Monitoring circuit 82 identifies the occurrence of overpeak events 52. This identification may take place by converting the complex samples of overpeak-capable signal stream 78 into magnitude scalars, finding local peaks from a stream of such magnitude scalars, and comparing such local peaks to threshold 48.

Desirably, overpeak events 52 are identified in time as precisely as practical. Temporal precision may be obtained by the use of multiple monitoring circuits 80, as taught in U.S. Pat. No. 6,104,761, or by providing overpeak-capable signal stream 78 at a data rate in excess of the minimum requirements of Shannon's sampling theory. Nothing prevents the inclusion of an interpolator (not shown) into the signal flow of overpeak-capable signal stream 78 to increase data rate using estimated sample values. When using an increased data rate for overpeak-capable signal stream 78, temporal precision in identifying overpeak events 52 may be obtained by requiring a magnitude scalar sample to be immediately preceded by and immediately followed by magnitude scalar samples of lesser value to be considered a local peak.

An output of monitoring circuit 80 couples to an input of impulse generator 84 and becomes active when an overpeak event 52 is detected. Impulse generator 84 is responsive to this output from monitoring circuit 80, overpeak-capable signal stream 78, and threshold 48. Impulse generator 84 generates a corrective impulse 54 in response to the occurrence of an overpeak event 52. When no overpeak event is detected, no corrective impulse 54 is generated. Impulse generator 84 compensates for the amount by which the magnitude of overpeak-capable signal stream 78 is in excess of threshold 48. Desirably, corrective impulse 54 exhibits a magnitude equal to the difference between the magnitude of overpeak-capable signal stream 78 at overpeak event 52 and threshold 48. In addition, corrective impulse 54 desirably exhibits a phase that is 180° rotated from the phase exhibited by overpeak-capable signal stream 78 at overpeak event 52.

An output of impulse generator 84 passes to a segmented pulse-shaping filter 86. Segmented pulse-shaping filter 86 generates a shaped pulse for each corrective impulse 54 generated by impulse generator 84. As discussed above, a shaped pulse is added to spectrally-constrained signal stream 42 to constrain the envelope of spectrally-constrained signal stream 42 without causing significant spectral regrowth.

FIG. 6 shows an exemplary shaped pulse 88 having a leading portion 90 and a trailing portion 92. Shaped pulse 88 represents a Nyquist-type pulse, which is acceptable for the purposes of the present invention and well-known in the art. However, other types of shaped pulses, such as Gaussian pulses and others, may be used as well. Desirably, shaped pulse 88 is symmetrical in time to minimize spectral regrowth. Moreover, shaped pulse 88 desirably begins at a near zero value 94 at the beginning of leading portion 90, then builds to a peak value 96 in the central region of shaped pulse 88, and diminishes from peak value 96 to a near zero value 98 at the end of trailing portion 92. The magnitude of peak 96 is responsive to, and preferably equal to, the magnitude of corrective impulse 54.

Referring to FIGS. 5 and 6, segmented pulse-shaping filter 86 filters corrective impulse 54 to generate shaped pulse 88. As depicted in FIG. 6, shaped pulse 88 extends both into the future and the past from the overpeak event 52 that caused its generation. However, pulse-shaping filter 86 is segmented to separately generate leading portion 90 and trailing portion 92 of shaped pulse 88.

Referring to FIGS., 5 and 7, FIG. 7 shows concurrently-generated leading and trailing portions 90 and 92 of shaped pulse 88, as generated by segmented pulse-shaping filter 86. Segmented pulse-shaping filter 86 includes a leading filter 100 and a trailing filter 102. Each of filters 100 and 102 is a FIR filter in the preferred embodiments. FIG. 5 depicts leading filter 100 as having cells, or taps, 0-7, with the seventh tap being designated "C" for center, and trailing filter 102 as having cells 8-14. Each cell may have the form represented by cell 105. In particular, each cell 105 may have an input signal fed to a delay element 106, and delay element 106 may have an output which serves as an output of the cell 105, to be used as the input to the next cell 105. The output of delay element 106 may drive a multiplier 108, and multiplier 108 may have an input that receives a coefficient dedicated to that cell 105. The output of the multiplier 108 is output from the cell 105 and such outputs from all cells 105 are summed together to provide the filter output.

In the preferred embodiments, approximately one-half of shaped pulse 88 is generated in each of filters 100 and 102. In order to have shaped pulse 88 be as symmetrical in time as possible, it is desirable to have an odd number of cells 104 in segmented pulse-shaping filter 86. Consequently, shaped pulse 88 cannot be precisely divided in half. The longer half of shaped pulse 88, including peak 96, is generated in leading filter 100, and the shorter half of shaped pulse 88, excluding peak 96, is generated in trailing filter 102. The coefficients used in leading and trailing filters 100 and 102 may correspond to coefficients used in pulse-shaping filter 40, with approximately the first ½ of the coefficients used in leading filter 100 and approximately the last ½ of the coefficients used in trailing filter 102. While FIG. 5 illustrates segmented pulse-shaping filter 86 as having 15 cells (0–14), those skilled in the art will appreciate that this precise number is used for illustrative purposes only, and that the present invention contemplates the use of any number of cells that may be suitable for a given application.

The output of trailing filter 102 is fed back to combining circuit 76, the output of leading filter 100 couples to a first input of a combining circuit 104, and the output of delay circuit 82 couples to a second input of combining circuit 104. An output of combining circuit 104 provides constrained-envelope, constrained-spectrum signal stream 56.

Delay circuit 82 delays overpeak-capable signal stream 78 by more than one-half of the duration of shaped pulse 88. In particular, delay circuit 82 imposes a delay of sufficient duration so that the portion of overpeak-capable signal stream 78 that was identified as an overpeak event 52 in monitoring circuit 80 is output from delay circuit 82 when corrective impulse 54 has progressed through leading filter 100 to the last cell 105 (i.e., the cell labeled "C" in FIG. 5) of leading filter 100. That way, the bulk of leading portion 90 (FIGS. 6–7) of shaped pulse 88 is added to overpeak-capable signal stream 78 prior to the occurrence of overpeak event 52 in overpeak-capable signal stream 78, and peak 96 (FIGS. 6–7) of shaped pulse 88 coincides with overpeak event 52 in overpeak-capable signal stream 78.

Since trailing portion 92 of shaped pulse 88 was generated early, concurrently with leading portion 90, and added to spectrally constrained signal stream 42 at combining circuit 76 prior to delaying in delay circuit 82, the trailing portion 92 of shaped pulse 88 has already been combined with signal stream 42 and will exit combining circuit 104 immediately following overpeak event 52. Since corrective impulse 54 passes through leading filter 100 to the last cell 105 at overpeak event 52, leading filter 100 will exert no further influence on signal stream 42 after overpeak event 52 arrives at combining circuit 104.

Figure 8:
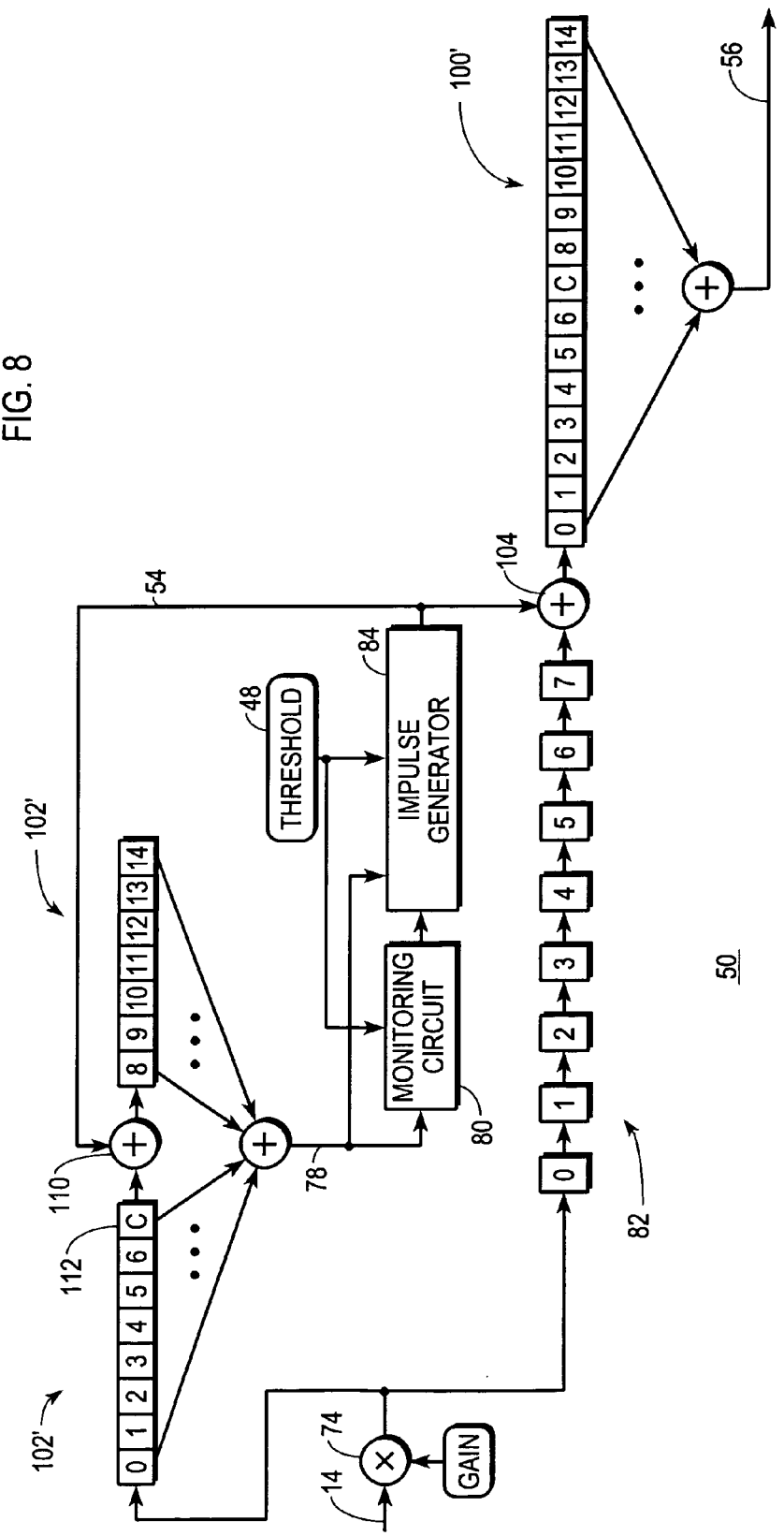
FIG. 8 shows a block diagram of a second embodiment of a constrained-envelope generator usable in the transmitter of FIG. 1.

FIG. 8 shows a block diagram of a second embodiment of a constrained-envelope generator 50. The embodiment of constrained-envelope generator 50 depicted in FIG. 8 performs an equivalent function to that discussed above in connection with FIG. 5, but incorporates the function of pulse shaping filter 40 (FIG. 1) therein. The FIG. 8 embodiment may be used for the upstream-most one of constrained-envelope generators 50 or as a sole constrained-envelope generator 50 in a transmitter 10 (FIG. 1).

Like the FIG. 5 embodiment, constrained-envelope generator 50 configured in accordance with the FIG. 8 embodiment includes monitoring circuit 80 and impulse generator 84 which are responsive to overpeak-capable signal stream 78 and to threshold 48 and which operate in the manner discussed above to identify overpeak events 52 and to generate corrective impulses 54. However, shaped pulse 88 is generated in combination with pulse shaping performed on spectrally-unconstrained communication signal 14. Like the FIG. 5 embodiment, trailing portion 92 of shaped pulse 88 is generated separately from but concurrently with leading portion 90 of shaped pulse 88, and trailing portion 92 is fed back to influence overpeak-capable signal stream 78.

In particular, pulse-spreading filter 40 may be omitted from transmitter 10 (FIG. 1) and spectrally-unconstrained communication signal 14 applied as an input to constrained-envelope generator 50 at optional scaling stage 74. The spectrally-unconstrained communication signal output from scaling stage 74 passes directly to a pre-processing pulse-shaping filter 102' and indirectly to a post-processing pulse-shaping filter 100' through delay circuit 82 and combining circuit 104. Delay circuit 82 and combining circuit 104 may be configured as discussed above in connection with FIG. 5, but with one exception. Corrective impulse 54 output from impulse generator 84 is applied directly to combining circuit 104 and to an adding circuit 110 inserted in pre-processing pulse-shaping filter 102' immediately downstream of a center tap 112 in pre-processing pulse-spreading filter 102'.

Post-processing pulse-shaping filter 100' is desirably equivalent to pulse-shaping filter 40 (FIG. 1). Except for the addition of adding circuit 110 located near the mid-point of pre-processing pulse-shaping filter 102', pre-processing pulse-shaping filter 102' may also be equivalent to pulse-shaping filter 40. In alternate embodiments, pre-processing pulse-shaping filter 102' may be a simpler implementation than post-processing pulse-spreading filter 100' by having fewer bits of resolution or fewer taps, or both. A simpler implementation may be possible because the output of post-processing pulse-spreading filter 100' provides overpeak-capable signal section 78, which is used only to generate corrective impulse 54, while post-processing pulse-spreading filter 100' generates constrained-envelope, constrained-spectrum communication signal 56, which is eventually broadcast from transmitter 10.

Pre-processing pulse-spreading filter 102' filters spectrally-unconstrained communication signal 14 with any corrective impulse 54 that may have been generated earlier due to the discovery of an earlier overpeak event 52. Since corrective impulse 54 is added to spectrally-unconstrained communication signal 14 mid-way through pre-processing pulse-spreading filter 102', only trailing portion 92 of shaped pulse 88 is developed therein. Of course, trailing portion 92 is developed in combination with the conversion of spectrally-unconstrained communication signal 14 into a spectrally-constrained communication signal.

Post-processing pulse-spreading filter 100' filters spectrally-unconstrained communication signal 14 with any corrective impulse 54 that may have been generated due to the discovery of an overpeak event 52. Delay circuit 82 is configured so that corrective impulse 54 is applied at the same time overpeak event 52 appears at the output of delay circuit 82 so that peak 96 (FIGS. 6–7) coincides with overpeak event 52. Post-processing pulse-spreading filter 100' generates the entirety of shaped pulse 88 while concurrently pulse shaping spectrally-unconstrained signal stream 14. Accordingly, trailing portion 92 of shaped pulse 88 is twice-generated, once in each of pulse-spreading filters 100' and 102'.

In summary, the present invention provides an improved constrained-envelope digital communications transmitter and method. The constrained-envelope digital communications transmitter and method discussed herein are provided to generate a signal which, when combined with a modulated signal that exhibits a predetermined bandwidth, reduces peak-to-average power ratio without significantly increasing the predetermined bandwidth. A modulated signal which exhibits a desired bandwidth but undesirably large peak-to-average power ratio is adjusted to lessen the peak-to-average power ratio without significantly increasing bandwidth. Spectrally constrained corrective pulses are added to a modulated signal in a manner that minimizes growth in peak-to-average power ratio caused by the corrective pulses. In one embodiment, at least two constrained-envelope generators are coupled in series so that a downstream constrained-envelope generator can compensate for peak-to-average power ratio growth caused by an upstream constrained-envelope generator.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of operating a digital communications transmitter to constrain envelope and spectral regrowth while processing a communication signal, said method comprising:
    monitoring an overpeak-capable signal stream to identify occurrences of overpeak events by determining when a threshold is exceeded;
    generating, when one of said overpeak events is identified, a corrective impulse configured to compensate for an amount by which said overpeak-capable signal stream is in excess of said threshold;
    filtering said corrective impulse to generate a shaped pulse having a leading portion and a trailing portion;
    feeding-back said trailing portion of said shaped pulse so that, after said one of said overpeak events, said overpeak-capable signal stream is responsive to said trailing portion of said shaped pulse and said communication signal; and
    producing a constrained-envelope signal stream in response to said communication signal and said corrective impulse.

2. A method as claimed in claim 1 wherein:
    said communication signal is a first communication signal;
    said constrained-envelope signal stream is both a first constrained-envelope signal stream and a second communication signal; and
    said method additionally comprises repeating said monitoring, generating, filtering, feeding-back, and producing activities with respect to said second communication signal to produce a second constrained-envelope signal stream.

3. A method as claimed in claim 2 wherein, when said monitoring and generating activities are used to produce said first constrained envelope signal stream, said threshold is greater than when said monitoring and generating activities are repeated to produce said second constrained-envelope signal stream.

4. A method as claimed in claim 1 wherein said monitoring, generating, filtering, feeding-back, and producing activities are performed in a first constrained-envelope generator and said method additionally comprises coupling a second constrained-envelope generator in cascade with said first constrained-envelope generator.

5. A method as claimed in claim 1 wherein said shaped pulse is configured to have a predetermined duration, and said method additionally comprises:
    delaying said communication signal by more than one-half of said predetermined duration to produce a delayed communication signal; and
    combining said delayed communication signal with a signal responsive to said corrective impulse.

6. A method as claimed in claim 5 wherein:
    said communication signal is a spectrally-unconstrained signal stream;
    said combining activity combines said corrective impulse with said delayed communication signal to produce a combined signal stream; and
    said filtering activity filters said combined signal stream in a pulse-shaping filter.

7. A method as claimed in claim 5 wherein:
    said communication signal is a spectrally-constrained signal stream generated by a first pulse-shaping filter;
    said filtering activity filters said corrective impulse in a second pulse-shaping filter; and
    said combining activity combines said leading portion of said shaped pulse generated by said filtering activity with said delayed communication signal.

8. A method as claimed in claim 1 wherein said filtering activity generates said leading portion of said shaped pulse in a first filter and generates said trailing portion of said shaped pulse in a second filter, said leading and trailing portions being generated concurrently.

9. A method as claimed in claim 8 wherein said shaped pulse is substantially symmetrical in time, building from a near zero value to a peak in said leading portion then diminishing from said peak to a near zero value in said trailing portion, and said first and second filters are configured so that said leading portion includes said peak and said trailing portion does not include said peak.

10. A method as claimed in claim 8 wherein:
said communication signal is a spectrally-unconstrained signal stream;
said first filter is a pulse-shaping filter that filters said spectrally-unconstrained signal stream combined with said corrective impulse so that said entire shaped pulse is generated while concurrently pulse-shaping said spectrally-unconstrained signal stream; and
said second filter is a pulse-shaping filter that filters said spectrally-unconstrained signal stream combined with said corrective impulse so that said trailing portion of said shaped pulse is generated while concurrently pulse-shaping said spectrally-unconstrained signal stream.

11. A method as claimed in claim 8 wherein:
said communication signal is a spectrally-unconstrained signal stream; and
said first filter generates said entire shaped pulse so that said trailing portion of said shaped pulse is twice-generated, once in each of said first and second filters.

12. A method as claimed in claim 8 wherein said communication signal is a spectrally-constrained signal stream generated by a pulse-shaping filter, and said method additionally comprises:
adding said trailing portion of said shaped pulse to said communication signal to produce said overpeak-capable signal stream;
delaying said overpeak-capable signal stream to produce a delayed-overpeak-capable signal stream; and
adding said leading portion of said shaped pulse to said delayed-overpeak-capable signal stream.

13. A digital communications transmitter with constrained-envelope and constrained spectral regrowth, said transmitter comprising:
a digital modulator configured to generate a spectrally-unconstrained digital communication signal;
a first constrained-envelope generator configured to filter said digital communication signal and produce a first constrained-envelope, constrained-spectrum signal stream, and said first constrained-envelope generator including a first monitoring circuit configured to identify occurrences of overpeak events in said spectrally-unconstrained digital communication signal by determining when a first threshold is exceeded; and
a second constrained-envelope generator configured to filter said first constrained-envelope, constrained-spectrum signal stream and produce a second constrained-envelope, constrained-spectrum signal stream, and said second constrained-envelope generator including a second monitoring circuit configured to identify occurrences of overpeak events in said first constrained-envelope, constrained-spectrum signal stream by determining when a second threshold is exceeded, wherein said first threshold is greater than said second threshold.

14. A digital communications transmitter with constrained-envelope and constrained spectral regrowth, said transmitter comprising:
a digital modulator configured to generate a spectrally-unconstrained digital communication signal;
a first constrained-envelope generator configured to filter said digital communication signal and produce a first constrained-envelope, constrained-spectrum signal stream, said first constrained-envelope generator comprising:
a monitoring circuit configured to identify occurrences of overpeak events in an overpeak-capable signal stream by determining when a threshold is exceeded, said overpeak-capable signal stream being responsive to said communication signal and to a trailing portion of a shaped pulse;
an impulse generator coupled to said monitoring circuit and configured to generate a corrective impulse configured to compensate for an amount by which said overpeak-capable signal stream is in excess of said threshold; and
a filtering circuit coupled to said impulse generator and configured to generate a leading portion of said shaped pulse and said trailing portion of said shaped pulse; and
a second constrained-envelope generator configured to filter said first constrained-envelope, constrained-spectrum signal stream and produce a second constrained-envelope, constrained spectrum signal stream.

15. A digital communications transmitter as claimed in claim 14 wherein said shaped pulse is configured to have a predetermined duration, and said first constrained-envelope generator additionally comprises:
a delay circuit for delaying said communication signal by more than one-half of said predetermined duration to produce a delayed communication signal; and
a combining circuit for combining said delayed communication signal with a signal responsive to said corrective impulse.

16. A digital communications transmitter as claimed in claim 14 wherein said filtering circuit generates said leading portion of said shaped pulse in a first filter and generates said trailing portion of said shaped pulse in a second filter, said leading and trailing portions being generated concurrently.

17. A digital communications transmitter as claimed in claim 16 wherein said shaped pulse is substantially symmetrical in time, building from a near zero value to a peak in said leading portion then diminishing from said peak to a near zero value in said trailing portion, and said first and second filters are configured so that said leading portion includes said peak and said trailing portion does not include said peak.

18. A digital communications transmitter with constrained envelope and constrained spectral regrowth, said transmitter comprising:
a digital modulator configured to generate a spectrally-unconstrained digital communication signal;
a monitoring circuit coupled to said digital modulator and configured to identify occurrences of overpeak events in an overpeak-capable signal stream by determining when a threshold is exceeded, said overpeak-capable signal stream being responsive to said digital communication signal and to a trailing portion of a shaped pulse;
an impulse generator coupled to said monitoring circuit and configured to generate a corrective impulse configured to compensate for an amount by which said overpeak-capable signal stream is in excess of said threshold; and
a filtering circuit coupled to said impulse generator and configured to generate a leading portion and said trailing portion of said shaped pulse.

19. A digital communications transmitter as claimed in claim 18 wherein said shaped pulse is configured to have a predetermined duration, and said digital communications transmitter additionally comprises:

a delay circuit for delaying said spectrally unconstrained digital communication signal by more than one-half of said predetermined duration to produce a delayed communication signal; and a combining circuit for combining said delayed communication signal with a signal responsive to said corrective impulse.

20. A digital communications transmitter as claimed in claim 19 wherein:

said combining circuit combines said corrective impulse with said delayed communication signal to produce a combined signal stream; and said filtering circuit filters said combined signal stream in a pulse-shaping filter.

21. A digital communications transmitter as claimed in claim 18 wherein said filtering circuit generates said leading portion of said shaped pulse in a first filter and generates said trailing portion of said shaped pulse in a second filter, said leading and trailing portions being generated concurrently.

22. A digital communications transmitter as claimed in claim 21 wherein:

said first filter of said filtering circuit is a pulse-shaping filter that filters said spectrally unconstrained digital communication signal in combination with said corrective impulse so that said entire shaped pulse is generated while concurrently pulse-shaping said spectrally unconstrained digital communication signal; and said second filter of said filtering circuit is a pulse-shaping filter that filters said spectrally unconstrained digital communication signal in combination with said corrective impulse so that said trailing portion of said shaped pulse is generated while concurrently pulse-shaping said spectrally unconstrained digital communication signal.

23. A digital communications transmitter as claimed in claim 21 wherein said first filter of said filtering circuit generates said entire shaped pulse so that said trailing portion of said shaped pulse is twice-generated, once in each of said first and second filters of said filtering circuit.

24. A digital communications transmitter with constrained-envelope and constrained spectral regrowth, said transmitter comprising:

a pulse-shaping filter configured to produce a spectrally-constrained communication signal;

a monitoring circuit coupled to said pulse spreading-filter and configured to identify occurrences of overpeak events in an overpeak-capable signal stream by determining when a threshold is exceeded, said overpeak-capable signal stream being responsive to said spectrally-constrained communication signal and to a trailing portion of a shaped pulse;

an impulse generator coupled to said monitoring circuit and configured to generate a corrective impulse configured to compensate for an amount by which said overpeak-capable signal stream is in excess of said threshold;

a filtering circuit coupled to said impulse generator and configured to filter said corrective impulse and generate said shaped pulse to exhibit a predetermined duration, with a leading portion and said trailing portion;

a delay circuit for delaying said spectrally-constrained communication signal by more than one-half of said predetermined duration to produce a delayed communication signal;

a first combining circuit coupled to said filtering circuit, to said pulse-shaping filter, and to said monitoring circuit for combining said spectrally-constrained communication signal and said trailing portion of said shaped pulse to produce said overpeak-capable signal stream; and a second combining circuit coupled to said filtering circuit and to said delay circuit for combining said delayed communication signal with said leading portion of said shaped pulse.

* * * * *